3,280,052
POLYAMIDES STABILIZED AGAINST DISCOLORATION FROM CARBON DISULFIDE BY THE ADDITION OF COPPER STEARATE AND THIOACETOAMIDES
Jun Watanabe and Soji Arakawa, both of 1 Ujinogami, Uji-shi, Kyoto-fu, and Kayomon Kyo, 16 Ujibiwa, Uji-shi, Kyoto-fu, Japan
No Drawing. Filed Oct. 9, 1962, Ser. No. 229,476
Claims priority, application Japan, Oct. 19, 1961, 36/37,336
1 Claim. (Cl. 260—18)

The present invention relates to improved polyamide compositions, and more particularly relates to polyamide compositions having improved stability.

Synthetic linear polyamide products when molded or exposed to the atmosphere at elevated temperature, undergo degradation which decreases the degree of polymerization and also impairs the physical properties of the product. It has been considered, therefore, to protect polyamides from heat deterioration by adding various stabilizers in the polymerization or molding stage. It is well known that a copper compound is one of such stabilizers. One can use many different examples of this compound for this purpose if they have the necessary solubility in the polyamides. The typical compounds of this kind are copper salts of organic acids, for example copper acetate and copper stearate.

These conventional compounds can stabilize the polyamides against thermal degradation. These compounds are unsatisfactory, however for moulding or like processes, the polyamides containing these compounds, for example, copper stearate, reddens at an elevated temperature because of the chemical change of the compounds. This defect can be avoided when one molds the polyamides with this compound at a comparatively low temperature, or adds certain halogen compounds, for example, hydrobromic acid, halide of a quaternary ammonium base and hydrochloride, hydrobromide, hydroiodide of an organic base, together with copper compounds. Polyamides obtained by these processes do not redden during molding, but molded products change their colors to yellow in the vapour of a compound such as carbon disulfide. In consequence, the commercial value of molded polyamides containing copper compounds decreases remarkably.

It is an object of the present invention to provide polyamide compositions which are fully improved in thermal stability and color stability as mentioned above. This object is accomplished by incorporating in the polyamides a sulphur containing compound together with a copper compound. The polyamides with the composition according to the present invention do not color in molding at an elevated temperature and, moreover, the molded articles do not become yellow in the vapour of a compound such as carbon disulfide. It is to be noted that in this case, the sulphur containing compounds do not interfere with the effect of copper compounds. Copper compound and sulphur containing compounds, thus, give the molded polyamides improved thermal and color stability. But it should be noted that they do not contribute to the polymer structure. It is evident, therefore, that the quantities which are added should be minimized in order to avoid deterioration of the physical properties of the products due to the addition.

Thus according to the present invention we provide surprisingly improved polyamides by incorporating with the polyamides a sulphur containing compound together with a copper compound so that the sulphur content of the former may be at least 0.1 times (by weight), preferably 5 times, the content of the latter.

We have made a great effort to find what sort of sulphur containing compounds should be incorporated, together with the copper compounds in polyamides. We have now found that almost all sorts of sulphur containing compounds except sulphates can be utilized for this purpose.

Preferred sulphur containing compounds which may be used in the process of the present invention are acid sodium sulphite, sodium thiosulfate, sodium sulfide, sodium thiocyanate, thiourea, thioacetoamide, dioxyethylsulfide dibenzyldisulfide, 2 - mercapto-benzimidazole, sulfanylamide, sulphosalicylic acid and sodium dinaphthyl-methane disulfonate. Thus the sulphur containing compounds which are implied in the present invention include all organic and inorganic sulphur containing compounds with the only exception being the sulfate. It is evident from the purpose of the invention that the boiling point of the sulphur compound is desirably higher than 250° C.

Many kinds of copper compounds which can be used in polyamides as a thermal stabilizer are suitable for the process of the present invention. In certain instances fine copper powder is desirable. Preferred examples of the copper compounds are copper salts of organic acids, e.g. copper acetate and copper stearate and copper halides, e.g. copper chloride and copper iodide.

The present invention is illustrated by the following examples. In the examples polycaprolactam was used as a polyamide, but the present invention is not limited by it.

*Example 1*

100 parts (by weight) of polycaprolactam (chip), 0.05 part of copper stearate and 0.05 part of thioacetoamide were mixed sufficiently and molded by an extruder at the temperature of 280° C. The molded material did not color in red and also did not change its color to yellow in the vapour of the carbon disulfide produced as a by-product. The molded material of the composition with copper stearate only, had, however, spotted red color. The molded material which was extruded at a comparatively low temperature, i.e. 260° C., or contained known halogen compound, i.e. morpholinium iodide, together with copper stearate had not a red color but changed to yellow in the vapour of carbon disulfide. The polycaprolactam with both copper stearate and thioacetoamide was extruded and then drawn to form a filament which had a tenacity of 8.3 grams per denier and an elongation of 18%. There was little difference between the physical properties of the filament with or without thioacetoamide. When the filamentary material with the composition described above was placed in the atmosphere at a temperature of 180° C. for 4 hours, it lost only 8% of the original tensile strength. This shows that the thioacetoamide does not impair the effect of the copper stearate.

*Example 2*

Polycaprolactam containing 0.05 part of copper stearate and several parts of acid sodium sulfite was extruded at 280° C. and then drawn to form filaments. The yarns formed from the filament were treated in the vapour of carbon disulfide. Their tensile properties and strength loss, a described in Example 1, were also tested.

The following table shows the physical properties in dependence on the amount of acid sodium sulfite.

| Acid sodium sulfite content, percent | Original color | $CS_2$ treated color | Tenacity, g./den. | Elongation, percent | Strength loss, percent |
|---|---|---|---|---|---|
| 0 | Reddish | Unchanged | 8.43 | 18.0 | 8.5 |
| 0.01 | White | do | 8.46 | 18.4 | 7.6 |
| 0.10 | do | do | 8.40 | 17.8 | 8.0 |
| 1.00 | do | do | 8.21 | 17.3 | 8.2 |
| 3.00 | do | do | 7.87 | 17.7 | 7.9 |

Example 3

Polycaprolactam containing 0.04 part of copper iodide and several parts of 2-mercaptobenzimidazole was extruded at 270° C. and then drawn into filaments. A similar testing procedure as described in Example 2 gave the following table.

| 2-mercapto-benzimidazole content, percent | Original color | $CS_2$ treated color | Tenacity, g./d. | Elongation, percent | Strength loss, percent |
|---|---|---|---|---|---|
| 0 | Green | Yellow | 8.44 | 18.2 | 5.5 |
| 0.05 | Pretty green. | Faintly yellow. | 8.41 | 18.6 | 4.8 |
| 0.5 | A little green. | Unchanged | 8.43 | 17.9 | 5.0 |
| 1.0 | White | ----do---- | 8.37 | 18.5 | 5.3 |

What we claim is:

A composition of matter comprising 100 parts by weight of polycaprolactam, 0.05 part by weight of copper stearate and 0.05 part by weight of thioacetoamides, said composition, after extrusion at about 260° C. and being drawn into a filament, having a tenacity of about 8 grams per denier and an elongation of about 18%, said filament being originally white in color and remaining white when exposed to the vapor of carbon disulfide.

References Cited by the Examiner

UNITED STATES PATENTS

| | | | |
|---|---|---|---|
| 2,630,421 | 3/1953 | Stamatoff | 260—45.7 |
| 2,790,734 | 4/1957 | Kuhn et al. | 260—45.75 |
| 2,864,803 | 12/1958 | Jones | 260—45.9 |
| 2,878,214 | 3/1959 | Holmes et al. | 260—45.7 |
| 3,113,120 | 12/1963 | Papero et al. | 260—45.75 |

FOREIGN PATENTS

| | | |
|---|---|---|
| 1,220,968 | 11/1960 | France. |
| 890,437 | 2/1962 | Great Britain. |
| 945,186 | 12/1963 | Great Britain. |

LEON J. BERCOVITZ, *Primary Examiner.*

G. W. RAUCHFUSS, JR., *Assistant Examiner.*